(12) United States Patent
Nishiura

(10) Patent No.: US 7,583,820 B2
(45) Date of Patent: Sep. 1, 2009

(54) MEDICAL-USE IMAGE DATA ANALYZING APPARATUS AND METHOD OF ANALYSIS USING THE SAME

(75) Inventor: Masahide Nishiura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 454 days.

(21) Appl. No.: 11/250,206

(22) Filed: Oct. 14, 2005

(65) Prior Publication Data

US 2006/0083416 A1  Apr. 20, 2006

(51) Int. Cl.
*G06K 9/00* (2006.01)

(52) U.S. Cl. .................. 382/107; 382/128; 600/407

(58) Field of Classification Search .................. 382/107, 382/128, 129–132; 600/407, 437
See application file for complete search history.

(56) References Cited

U.S. PATENT DOCUMENTS

| 4,337,661 | A  | * | 7/1982 | Kretz ........................... 600/440 |
| 6,262,435 | B1 |   | 7/2001 | Plat et al. |
| 2001/0024516 | A1 | * | 9/2001 | Yoshioka et al. ............ 382/128 |
| 2003/0171668 | A1 | * | 9/2003 | Tsujino et al. .............. 600/407 |

FOREIGN PATENT DOCUMENTS

| JP | 08-103427 | 4/1996 |
| JP | 2003-175041 | 6/2003 |
| JP | 2004-135929 | 5/2004 |
| JP | 2006-026079 | 2/2006 |
| WO | 2004003851 | 1/2004 |

OTHER PUBLICATIONS

Japanese Office Action dated Apr. 14, 2009 corresponding to U.S. Appl. No. 11/250,206 filed on Oct. 14, 2005.
Japanese Office Action dated Aug. 12, 2008 corresponding to U.S. Appl. No. 11/250,206 filed on Oct. 14, 2005.

* cited by examiner

*Primary Examiner*—Aaron W Carter
(74) *Attorney, Agent, or Firm*—Turocy & Watson, LLP

(57) ABSTRACT

A medical-use image data analyzing apparatus, aiming for detecting with a simple operation, presence or extent of difference in timing of movements among local portions as to facilitate diagnosis of diseases such as cardiac infarction, includes: an image input unit configured to input an image data of a test subject; a movement detector configured to detect movement of the test subject, based on the image data; a time distance calculator which calculates a time distance up to a time point when movement parameter, which is calculated from the movement, reaches local maximum or local minimum; a display device configured to display the time distances for the respective local portions of the test subject; and a memory.

5 Claims, 8 Drawing Sheets

US 7,583,820 B2

MEDICAL-USE IMAGE DATA ANALYZING APPARATUS AND METHOD OF ANALYSIS USING THE SAME

CROSS-REFERENCE TO RELATED APPLICATIONS

This application is based upon and claims the benefit of priority from the prior Japanese Patent Application No. 2004-302123, filed on Oct. 15, 2004; the entire contents of which are incorporated herein by reference.

TECHNICAL FIELD

The present invention relates to a medical-use image data analyzing apparatus for analyzing movement of organs or the like.

BACKGROUND OF THE INVENTION

It is important to measure movement of organs accurately as exemplified by a diagnosis of cardiac disease. A pumping function of a heart can be obtained by expansion and constriction of the heart at adequate timings. For example, in the case of cardiac infarction, which is one of the cardiac diseases in which part of cardiac muscle does not function normally and hence its pumping function is lowered, it is considered that timings of expansion and constriction are important indicator or "barometer" of symptoms in diagnosis.

Hitherto disclosed are methods of finding displacement of each local portion of a test subject from ultrasonic signals or image data and calculating component of movement in a supposed direction in order to measure the movement of organs quantitatively (for example, see JP-A-2003-175041, JP-A-2004-135929).

However, conventionally there has been no method of easily comparing timings of expansion and constriction among several local portions.

Thus, it is aimed to provide a medical-use image data analyzing apparatus for analyzing movement of a test subject, which enables easy comparison of timings of expansion and constriction among several local portions; wherein presence or absence and extent of difference of timings of movement among the respective local portions can be found with a simple operation; as well as a method of analysis using the same.

BRIEF SUMMARY OF THE INVENTION

According to an embodiment of the present invention, a medical use image data analyzing apparatus includes: an image input unit configured to input a time-series image data of a test subject; a movement detector configured to detect displacements of respective local portions on the test subject, based on the time-series image data; a time distance calculator which calculates a predetermined movement parameter from the displacement within a preset time section of a period for the time-series image data, and calculates a time distance up to a time point when the movement parameter reaches maximum or minimum value within the preset time section; and a display device configured to display the time distances for the respective local portions.

According to another embodiment of the invention, a medical use image date analyzing apparatus includes: an image input unit configured to input a time series image data of a test subject; a movement detector configured to detect displacements of respective local portions of the test subject, based on the time series image data; a movement parameter variation calculator which calculates a predetermined movement parameter from the displacement and calculates time-wise variation in the movement parameter; and a display device configured to display the time-wise variation for the respective local portions.

DETAILED DESCRIPTION OF THE INVENTION

FIRST EMBODIMENT

Referring now to FIG. 1 to FIG. 4, a first embodiment of the present invention will be described.

(1) Structure of Medical Use Image Data Analyzing Apparatus

Figure 1:
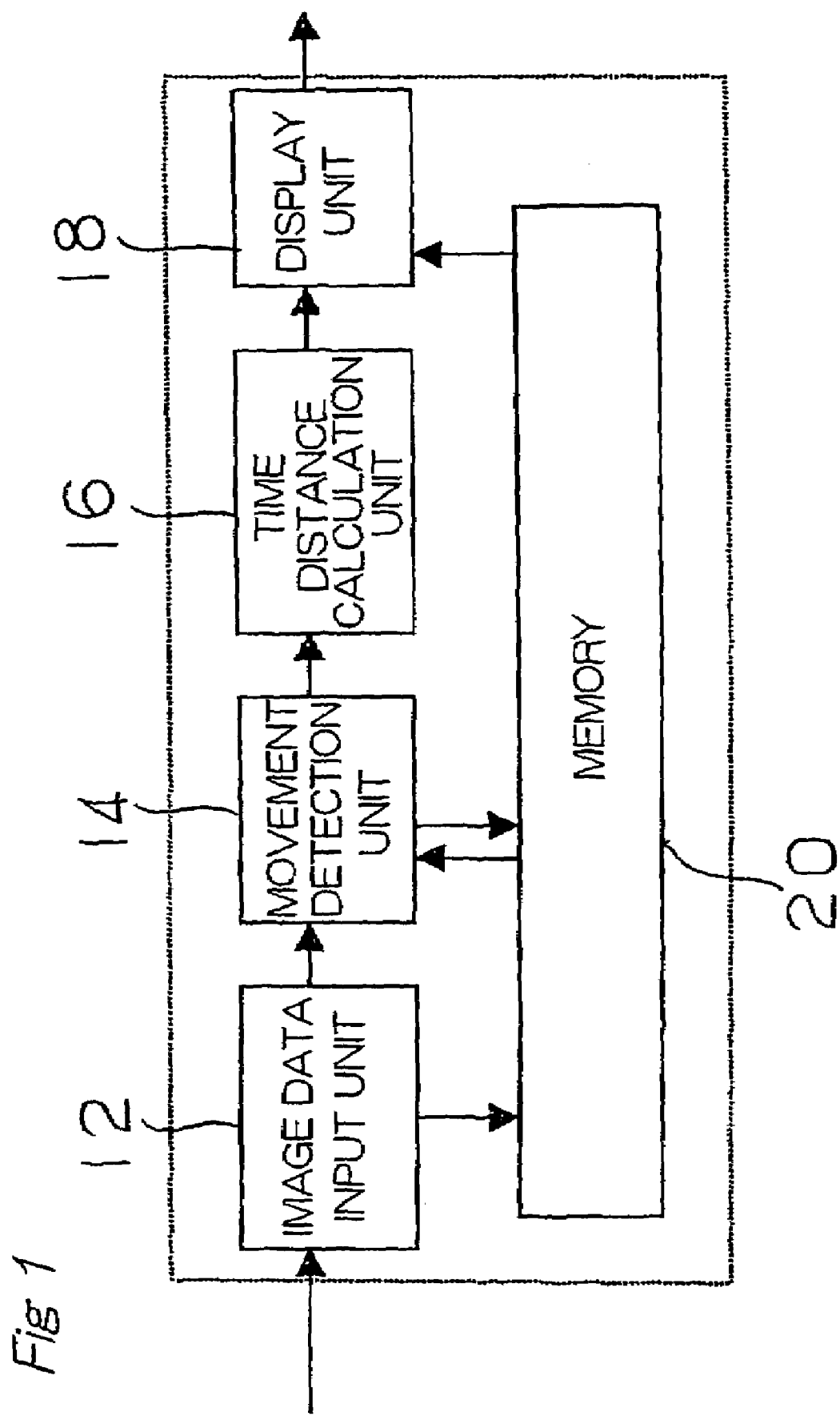
FIG. 1 is a block diagram of a medical-use image data analyzing apparatus according to a first embodiment of the present invention.

FIG. 1 is a block diagram of a medical use image data analyzing apparatus 10 according to the first embodiment.

The medical use image data analyzing apparatus 10 according to the first embodiment is inputted with data of images of a test subject, which is acquired by a separate device, and displays differences in timing of movement of respective local portions of the test subject, as an output data.

The medical use image data analyzing apparatus 10 according to the first embodiment includes; an image data input unit 12 for inputting an image data; a movement detection unit 14 for detecting movement of a test subject using the image data; a time distance calculation unit 16 for calculating a time distance up to a time point when a movement parameter calculated from the detected movement reaches the maximum value or the minimum value (or turning value as a local maximum or minimum, referred to as "kyokuchi" in Japanese); a display unit 18 for displaying the time distances for the respective local portions of the test subject; and a memory 20, as shown in FIG. 1.

(2) Detailed Operation of Medical Use Image Data Analyzing Apparatus 10

Figure 2:
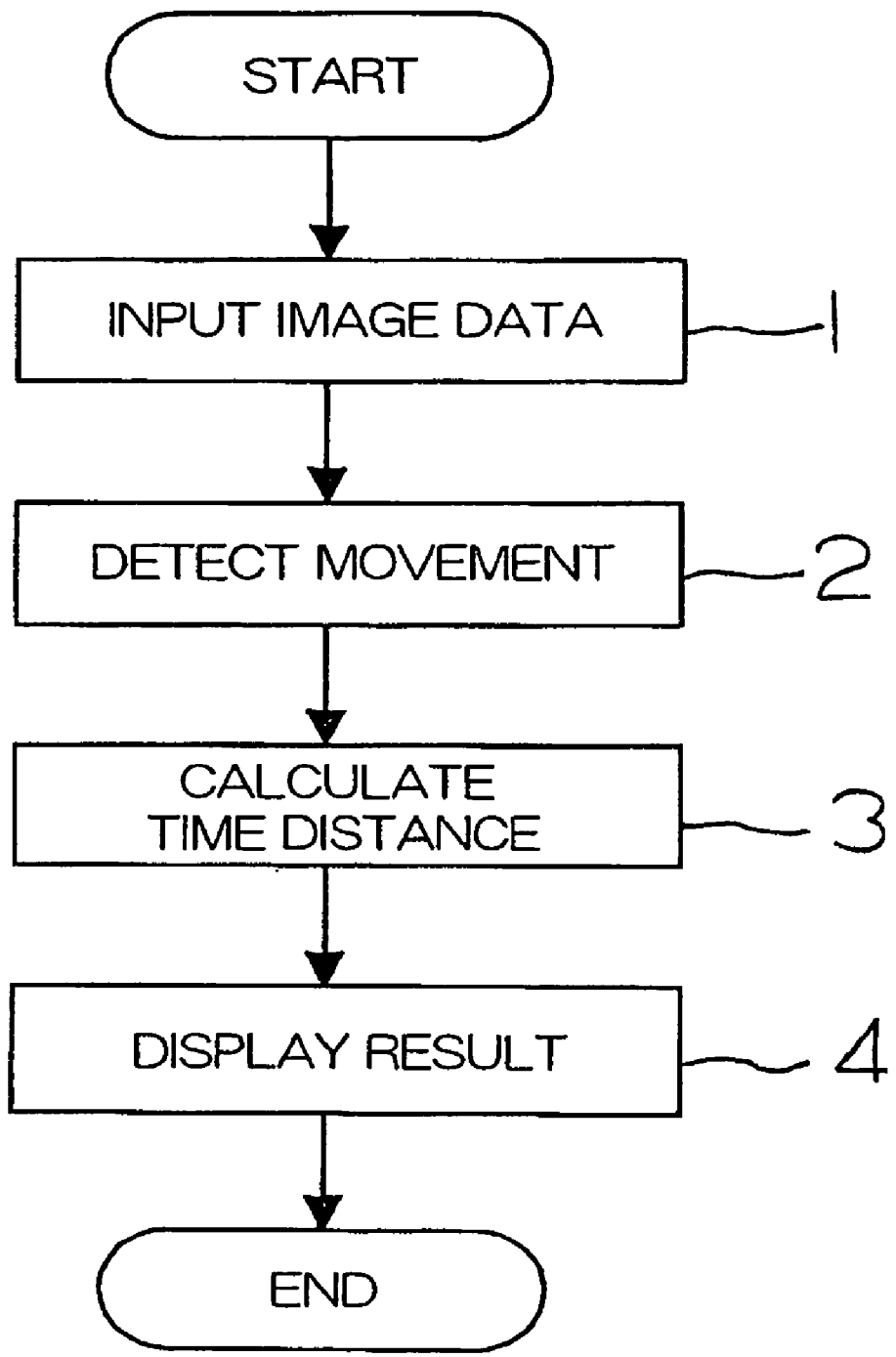
FIG. 2 is a flowchart showing operation of the apparatus according to the first embodiment.

Subsequently, the operation of the medical use image data analyzing apparatus 10 according to the first embodiment will be described on the basis of the flowchart in FIG. 2.

In Step 1, a time series image data obtained by a medical use image diagnostic equipment is inputted and stored in the memory 20 by the image data input unit 12. The image data may be two-dimensional or three-dimensional luminance data that represents, by gray scale, reflective echo strength, which is obtained, for example, by a sonic wave diagnostic apparatus; in otherwise, the image data may be composed of CT values obtained by a CT apparatus.

Subsequently, in Step 2, the movement detection unit 14 detects the amount of movement in respect of all or part of the coordinates on the basis of the image data. The amount of movement corresponds, for example, to displacement between a time instant 1 (frame 1) and a time instant 2 (frame 2) of the time series image data. In order to calculate the displacement between the frames, for example, the method disclosed in JP-A-2003-250804 may be employed. According to this method, a plurality of regions of interest, or areas for paying regard, are set on the image data; and the amount of movement is obtained on the basis of information on each of a plurality of feature points included in the respective regions of interest. The regions of interest are set as follows: a contour of a heart or a cardiac muscle area is extracted, and then the regions of interest are set on the image on the basis of the contour thus extracted. The feature points are extracted and tracked only on the regions of interest. The amounts of movement thus calculated are respectively stored in the memory 20 as to be associated with their coordinates.

This movement detection is carried out on whole of the time series images to be processed. For example, the amount of movement between the adjacent frames is obtained for all the frames to be processed. In this case, since the displacements between the adjacent frames are calculated for the respective coordinates in the images, when focusing or paying attention to one point in the image in the first frame (one point on the test subject), the coordinates in the next frame can be found by adding the displacement of the coordinates of this point. By repeating this procedure for all the frames, such a focused point is tracked. From results of such tracking, time-wise varying or moment-to-moment change of movement parameters (length of displacement by itself or speed, strain, and so on) at the focused point are also obtained.

Subsequently, in Step 3, the time distance calculation unit 16 calculates the time distance until the movement parameter reaches the maximum value or the minimum value for the focused point. This calculation of the maximum value or the minimum value is performed for a predetermined time section. For example, a time instance C at which the amount of movement reaches the maximum value or the minimum value between a time instance A and a time instance B is obtained. In order to compare the timing, a time period T between the time instance C and the time instance A may be obtained as the time distance. The time period T until the maximum value or the minimum value is obtained is calculated for each point on the image at the time instance A. Alternatively, by calculating the time period T only for the coordinates in the vicinity of the test subject, the amount of calculation can be reduced efficiently in comparison with the case in which calculation is performed for all the points on the entire image.

Figure 3:
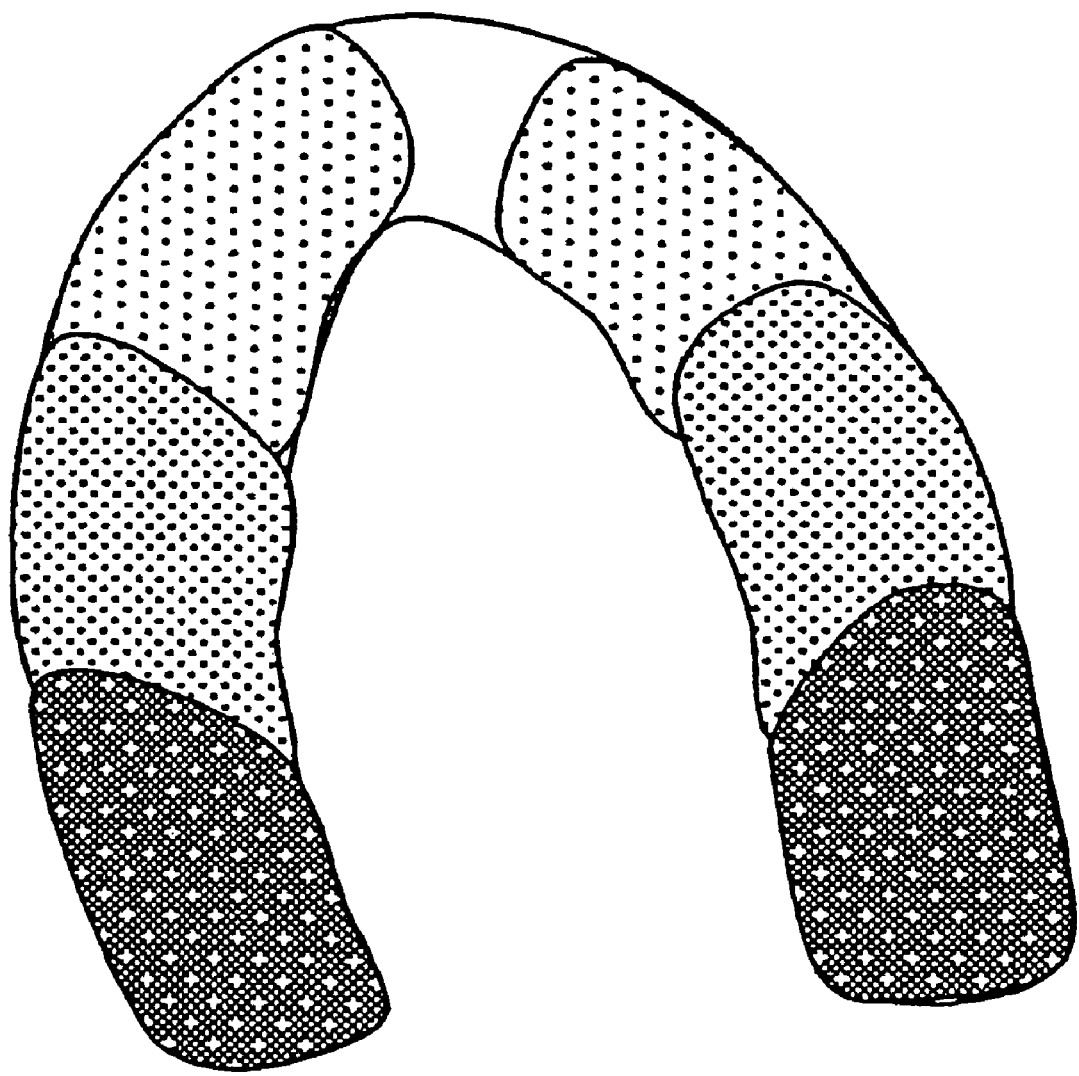
FIG. 3 is an example of display image (display example 1) according to the first embodiment.

Finally, in Step 4, the time period T calculated for each point is displayed on a display unit 18. For example, a new image is created with colors, each of which is allocated according to the value of the time period T as shown in FIG. 3 (since the drawings cannot be shown in colors, they are differentiated by dot patterns); and the new image is displayed on the original image in an overlapped manner. By such manner of display, a viewer can easily recognize the presence or absence and the extent of the difference in moving timing of the each local portion of the test subject.

As described thus far, according to the first embodiment, the temporal timing at which the movement parameter of the test subject reaches an extreme value can be grasped easily. Hence information useful for diagnosis of a disease is provided as far as the movement becomes a barometer of symptom of the disease.

(3) Modification of the Display Method

Figure 4:
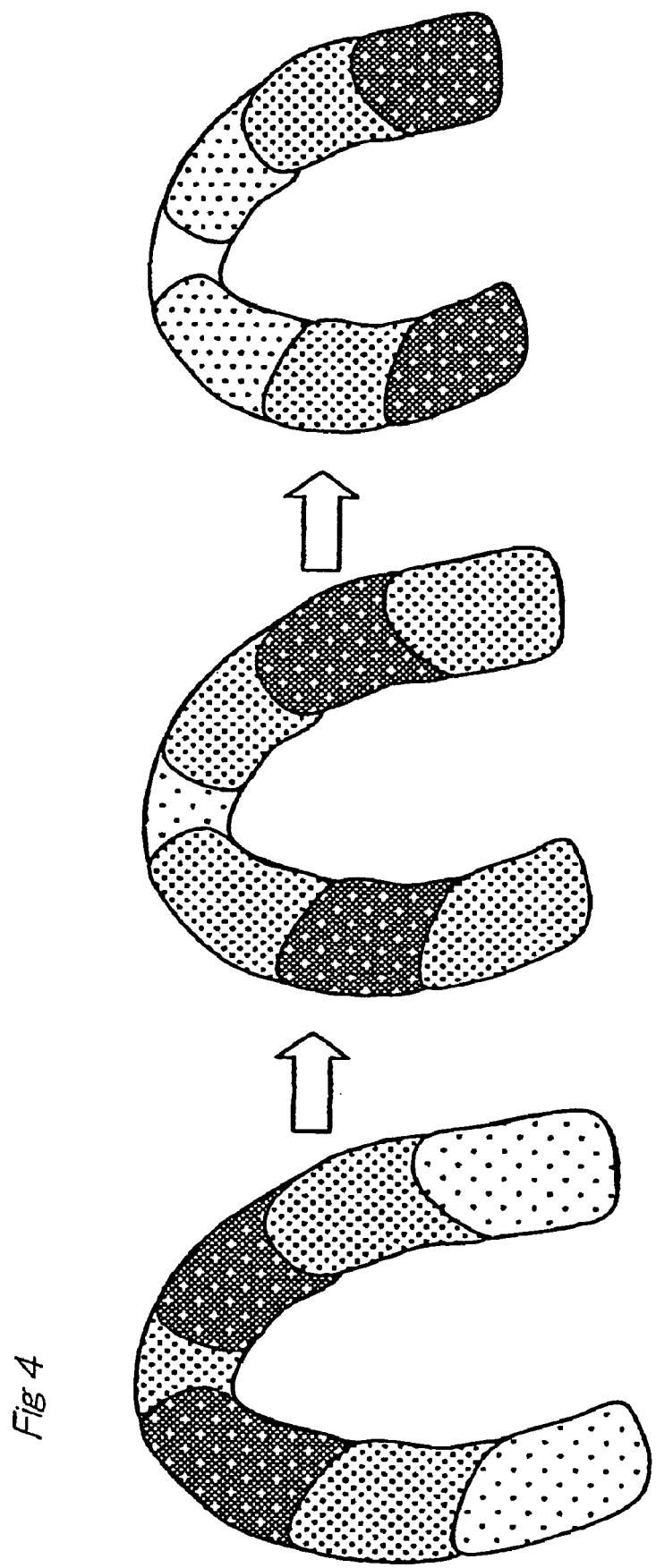
FIG. 4 is another example of display image (display example 2) according to the first embodiment.

As a modification of the display method of the display unit 18, a moving image is displayed by time-wise varying the display according to the movement parameter at each time instance, as shown in FIG. 4; thereby, transition or propagation of the moving state can be grasped easily.

SECOND EMBODIMENT

Subsequently, referring to FIG. 5 to FIG. 8, a medical use image data analyzing apparatus 10 according to a second embodiment will be described.

The medical use image data analyzing apparatus 10 according to the second embodiment is an example in which the temporal transitions or history of the moving states of the respective local portions are displayed more quantitatively.

(1) Structure of the Medical Use Image Data Analyzing Apparatus

Figure 5:
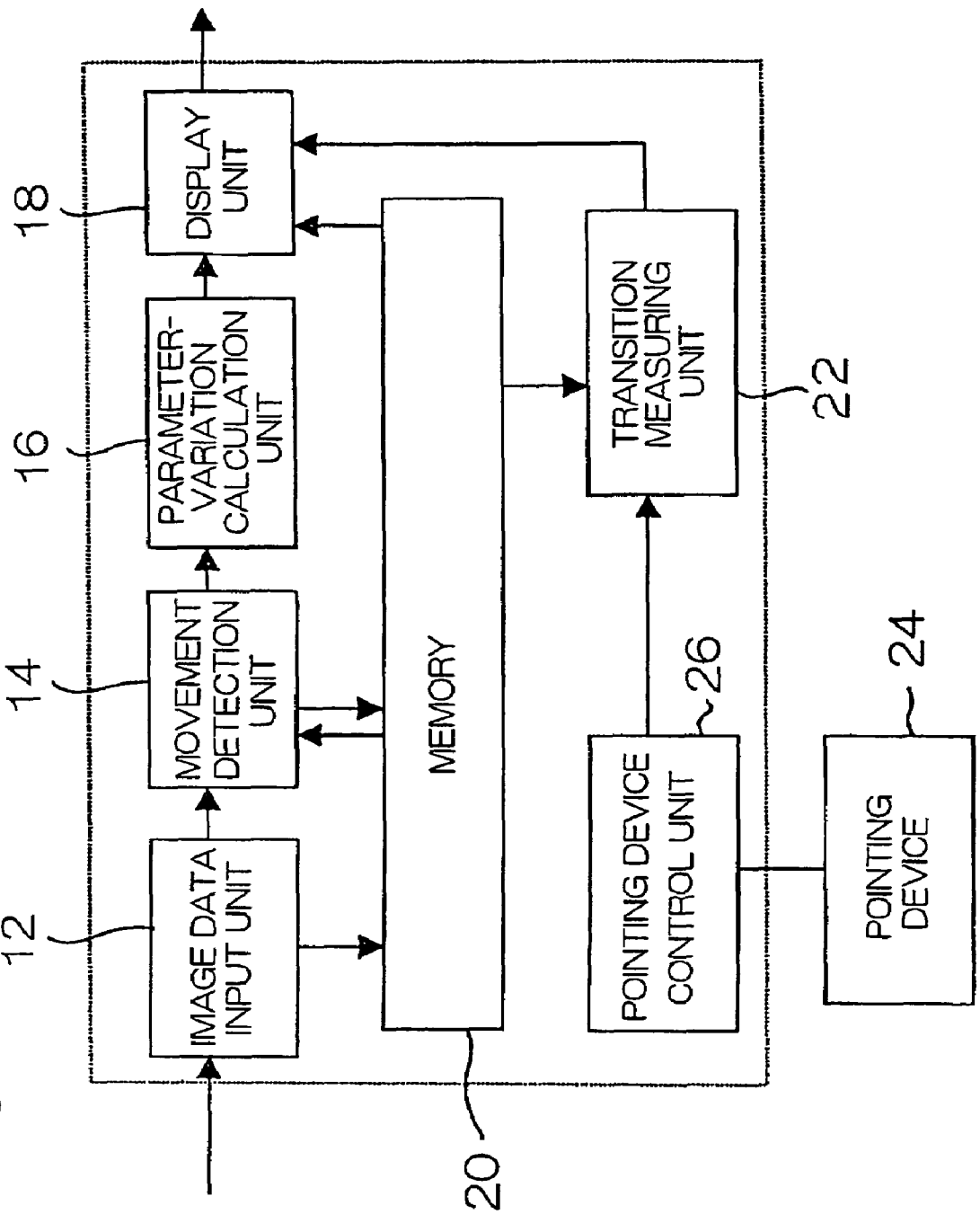
FIG. 5 is a block diagram of a medical-use image data analyzing apparatus according to a second embodiment.

The medical use image data analyzing apparatus 10 includes, as shown in FIG. 5; the image data input unit 12 for inputting the image data; the movement detection unit 14 for detecting the movement of the test subject using the image data; a movement parameter variation calculation unit 17 for calculating the movement parameters from the detected movement for the respective local portions at each time instance; the display unit 18 for listing and displaying variations of the movement parameters for a plurality of the local portions; a memory 20; a transition measuring unit 22 for measuring transition and propagation of state of the movement; a pointing device 24 to be used by an operator for pointing operation; and a pointing device control unit 26.

(2) Detailed Operation of the Medical Image Data Analyzing Apparatus 10

Figure 6:
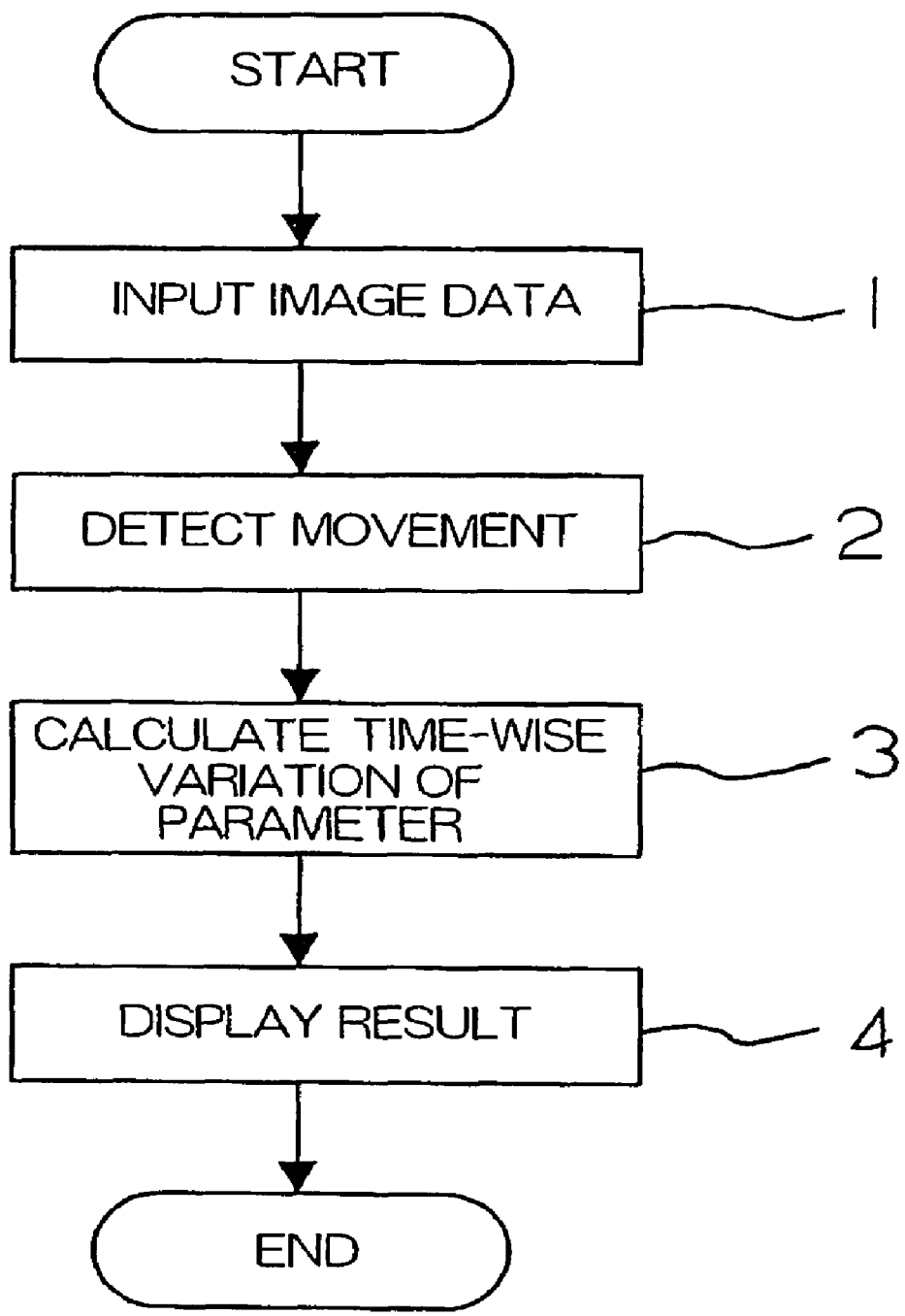
FIG. 6 is a flowchart showing operation of the apparatus according to the second embodiment.

Subsequently, referring to the flowchart in FIG. 6, the operation of the medical use image data analyzing apparatus 10 according to the second embodiment will be described.

The operations of the image input unit 10 for inputting the image data and of the movement detection unit 14 for detecting the movement of the test subject using the image data in Step 1 and Step 2 are the same as in the first embodiment.

Subsequently, in Step 3, the movement parameter variation calculation unit 17 calculates the time-wise variation of the movement parameters (length of displacement by itself or speed, strain, and so on), or movement parameter values in each time instance, for the respective local portions of the test subject, using the information detected by the movement detection unit 14; and stores such result in the memory 20.

Figure 7:
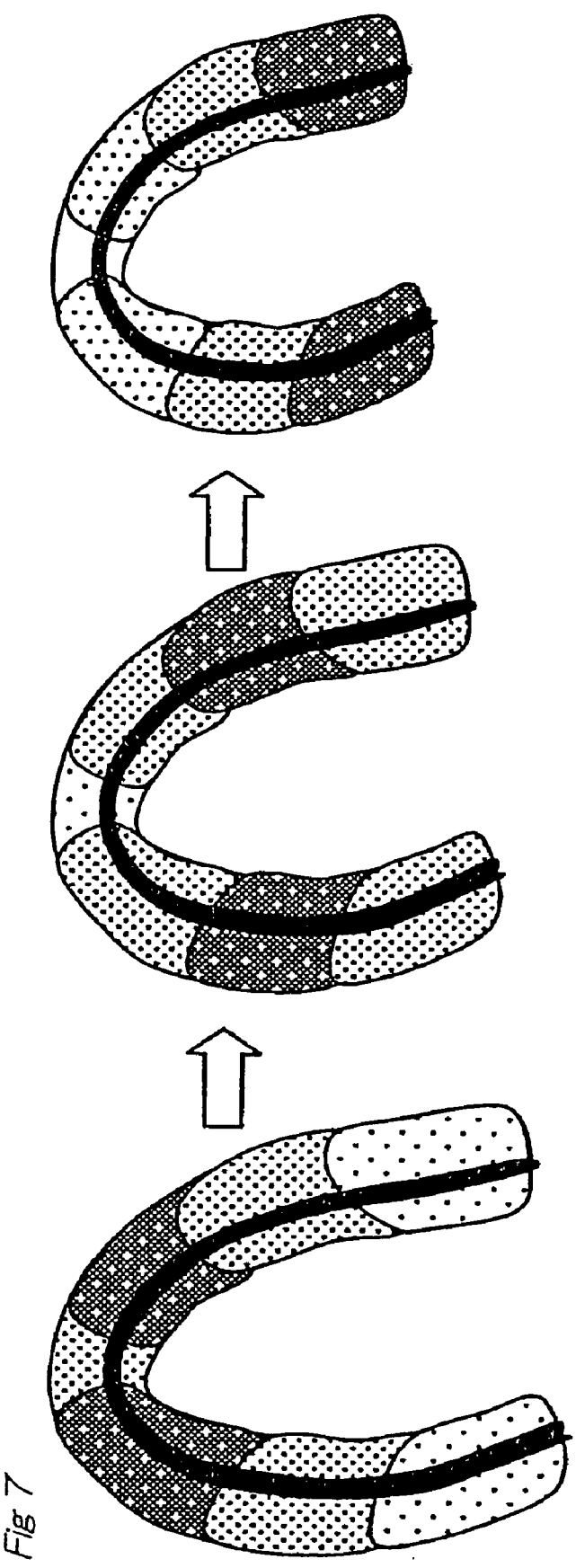
FIG. 7 is an example of display image, which shows setting of "Region of Interest (ROI)", according to the second embodiment.
Figure 8:
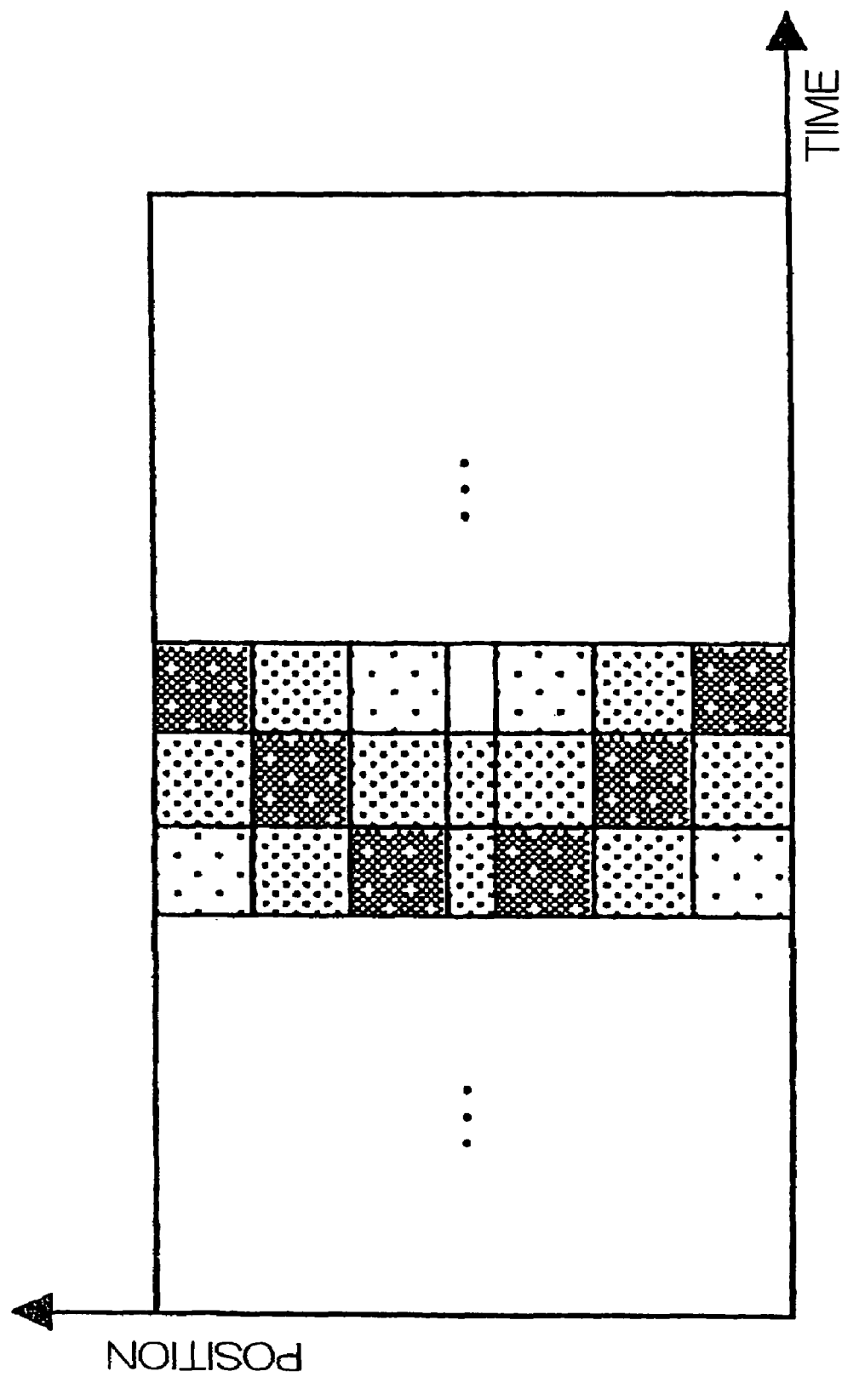
FIG. 8 is an example of display image showing patterns in a graph-wise arrangement, of the second embodiment.

Subsequently, in Step 4, the time-wise variations at the respective local portions (for example, in the "Region of Interest (ROI)" indicated by a black ribbon or band in FIG. 7) are listed and displayed as in FIG. 8. In FIG. 8, an axis of abscissa represents time and an axis of ordinate represents a position along the ROI.

By outputting and displaying as described above, the positional transition of the movement can be observed as oblique patterns, or oblique arrangements or sequences, on the output on a display screen. Hence the presence or absence of the transition of the movement, the direction of transition, and synchronicity among the plurality of transitions can be grasped easily.

(3) Modification

By measuring the inclination and/or the length of the oblique patterns on the output display of the display unit 18 shown in FIG. 8, a spatial length, a temporal length, and/or speed of the transition of the movement can be also measured quantitatively.

Setting of the ROI and measurement on transition of the movement are carried out by using the pointing device 24.

As described above, according to the second embodiment, more detailed information such as the spatial transition and propagation of the movement of the test subject can be visually grasped easily. Moreover, the quantitative measurement thereof can be achieved. These contribute a lot to the diagnosis of diseases, as far as the movement becomes a barometer of symptom of the disease.

<Other Modifications>

The image data to be processed is not limited to two-dimensional image data, and may be three-dimensional image data.

In examples of the above-described embodiments, the image data is inputted and the results of the temporal analysis of the movement are outputted. Nevertheless, invention-wise apparatus or its function may be integrated into the imaging diagnostic apparatus itself. In such arrangement, the procedures from acquisition of the image to the analysis according to the embodiments of the invention can be performed advantageously on a single apparatus. Alternatively, invention-wise functions as in the embodiments may be realized by a software program, which is run on a multi-purpose computer. When the functions are realized by the software, analysis at sites remote from the diagnostic apparatus is enabled.

What is claimed is:

1. A medical-use image data analyzing apparatus comprising:
    an image input unit configured to input a time-series image data of an object to be measured;
    a movement detector configured to detect displacements of respective local portions on the object to be measured, based on the time-series image data;
    a time distance calculator which calculates a movement parameter from the displacement within a preset time section of a period for the time-series image data, and calculates a time distance up to a time point when the movement parameter reaches maximum or minimum value within the preset time section; and
    a display device configured to generate a new image by a color or a pattern allocated according to the time distance calculated about each of the local portions, overlap the new image on an original image, and display the overlapping images.

2. The medical-use image data analyzing apparatus according to claim 1, wherein the movement parameter is a spatial length of or a speed of the displacement, or strain as a result of the displacement.

3. A method of analyzing medical-use image data comprising the steps of:
    inputting a time-series image data of an object to be measured;
    detecting displacements of respective local portions on the object to be measured, on basis of the time-series image data;
    calculating a movement parameter from the displacement within a preset time section of a period for the time-series image-data, and calculating a time distance up to a time point when the movement parameter reaches the maximum value or the minimum value in the preset section; and
    generating a new image by a color or a pattern allocated according to the time distance calculated about each of the local portions, overlapping the new image on an original image, and displaying the overlapping images.

4. The method of analyzing medical-use image data according to claim 3, wherein the movement parameter is a spatial length of or a speed of the displacement, or strain as a result of the displacement.

5. A program for analyzing medical-use image comprising:
    data stored on a computer-readable medium to cause a computer to execute instructions of:
        inputting a time-series image data of an object to be measured;
        detecting displacements of respective local portions of the object to be measured on basis of the time-series image data;
    calculating a movement parameter from the displacement within a preset time section of a period for the time-series image data, and calculating a time distance up to a time point when the movement parameter reaches maximum or minimum value within the preset time section; and
    generating a new image by a color or a pattern allocated according to the time distance calculated about each of the local portions, overlapping the new image on an original image, and displaying the overlapping images.

* * * * *